(12) United States Patent
Kwon

(10) Patent No.: US 8,165,412 B2
(45) Date of Patent: Apr. 24, 2012

(54) METHOD FOR DECODING BINARY IMAGE AT HIGH SPEED

(75) Inventor: Jong Min Kwon, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1115 days.

(21) Appl. No.: 12/026,050

(22) Filed: Feb. 5, 2008

(65) Prior Publication Data

US 2008/0199089 A1    Aug. 21, 2008

(30) Foreign Application Priority Data

Feb. 16, 2007  (KR) .................. 10-2007-0016859

(51) Int. Cl.
 *G06K 9/36* (2006.01)
(52) U.S. Cl. ........ 382/232; 382/233; 382/245; 382/246; 382/250
(58) Field of Classification Search .................. 382/232, 382/233, 239, 245, 246, 250, 251, 253; 358/500, 358/468, 498, 444
See application file for complete search history.

(56) References Cited

U.S. PATENT DOCUMENTS

| | | | | | |
|---|---|---|---|---|---|
| 4,694,352 | A | * | 9/1987 | Ina et al. | 382/239 |
| 5,568,167 | A | * | 10/1996 | Galbi et al. | 348/589 |
| 5,719,686 | A | * | 2/1998 | Sakamoto et al. | 358/444 |
| 5,838,822 | A | * | 11/1998 | Nobuta | 382/232 |
| 6,683,978 | B1 | * | 1/2004 | Iourcha et al. | 382/166 |
| 7,936,917 | B2 | * | 5/2011 | Stevens | 382/162 |

FOREIGN PATENT DOCUMENTS

JP    2001-238087    8/2001

* cited by examiner

*Primary Examiner* — Samir Ahmed
*Assistant Examiner* — Ali Bayat
(74) *Attorney, Agent, or Firm* — Staas & Halsey LLP

(57) ABSTRACT

A method for decoding a binary image at a high speed, wherein blocks having same pixel values are decoded in clock units, such that a decoding speed increases. The method includes: determining whether a predetermined number of sequential pixels corresponds to any one of a white_run, a black_run, and a combined_run; and if the predetermined number of sequential pixels corresponds to any one of the white_run, the black_run, and the combined_run, decoding the sequential pixels in a block per clock unit.

25 Claims, 11 Drawing Sheets

FIG. 4

| | 9 | 8 | 7 | 1 | 2 | 3 | 4 | 5 | 6 | 7 | 8 | |
|---|---|---|---|---|---|---|---|---|---|---|---|---|
| 6 | 5 | 4 | 3 | 2 | 1 | 2 | 3 | 4 | 5 | 6 | 7 | 8 |
| 1 | 0 | ? | | | | | | | | | | |

$\underbrace{\phantom{XXXXXXXX}}_{CX3}$ $\underbrace{\phantom{XXXXXXXXXXXXXXXXXXXXXXXXXX}}_{BLOCK3}$

FIG. 5

| | 9 | 8 | 7 | 6 | 5 | 4 | 1 | 2 | 3 | 4 | 5 | 6 | 7 | 8 |
|---|---|---|---|---|---|---|---|---|---|---|---|---|---|---|
| 3 | 2 | 1 | 0 | ? | | | | | | | | | | |

CX2　　　　　　　　BLOCK2

FIG. 6

| | | 9 | 8 | 7 | 6 | 5 | 4 | 1 | 2 | 3 | 4 | 5 | 6 | 7 | 8 |
|---|---|---|---|---|---|---|---|---|---|---|---|---|---|---|---|
| 3 | 2 | 1 | 0 | ? | | | | | | | | | | | |

<WHITE_RUN>

FIG. 7

<BLACK_RUN>

FIG. 8

| | | | | | 9 | 8 | 7 | 6 | 5 | 4 | 1 | 2 | 3 | 4 | 5 | 6 | 7 | 8 |
|---|---|---|---|---|---|---|---|---|---|---|---|---|---|---|---|---|---|---|
| 3 | 2 | 1 | 0 | ? | | | | | | | | | | | | | | |

<COMBINED_RUN>

FIG. 9

| | | | | |9|8|7|6|5|4|1|2|3|4|5|6|7|8|
|---|---|---|---|---|---|---|---|---|---|---|---|---|---|---|---|---|---|
|3|2|1|0|?|

<COMBINED_RUN>

METHOD FOR DECODING BINARY IMAGE AT HIGH SPEED

CROSS-REFERENCE TO RELATED APPLICATION

This application claims the benefit of Korean Application No. 2007-16859, filed on Feb. 16, 2007 in the Korean Intellectual Property Office, the disclosure of which is incorporated herein by reference.

BACKGROUND OF THE INVENTION

1. Field of the Invention

Aspects of the present invention relate to a method of decoding a binary image at high speed, and more particularly to a method of decoding a binary image at a high speed during a pixel decoding process of a Joint Bi-level Image Experts Group (JBIG).

2. Description of the Related Art

JBIG is an international standard of a binary-image compression algorithm from the Joint Bi-level Image Experts Group. The JBIG algorithm is based on an arithmetic coding process. Specifically, context data appears in the form of a peripheral pattern at each pixel of the corresponding image, and is used to search for a statistical prediction indicating which of the pixels are white or black.

The JBIG decoding process uses a context value defined in 10 bits including neighboring pixel information that has already been decoded. The JBIG decoding process calculates a Less Probable Symbol Size (LSZ) value and a More Probable Symbol (MPS) value, estimates a current pixel using the LSZ and MPS values, and decodes the estimated result. In this case, the LSZ value is indicative of status information calculated by the above-mentioned context value, and the MPS value is indicative of another value calculated by the above-mentioned context value.

However, the conventional system has a sequential structure in pixel units (i.e., 1 pixel or 1 clock units), such that the speed of the conventional system is fixed according to images. For example, if the image is all in white, the horizontal size of the image is 10000 pixels, and the vertical size of the image is 10000 pixels, then the image data is compressed over a time period corresponding to (10000×10000) clocks even though the code size is relatively small.

Therefore, because the conventional system performs calculations in pixel units, the execution speed is slow, uses time to process overlapped parts such as blanks, and decreases a decoding speed.

SUMMARY OF THE INVENTION

Aspects of the present invention provide a method of decoding a binary image at a high speed, wherein the method decodes sequential blocks having the same pixel values in block units, thereby increasing a decoding speed.

Additional aspects and/or advantages of the invention will be set forth in part in the description which follows and, in part, will be obvious from the description, or may be learned by practice of the invention.

According to an aspect of the present invention, there is provided a method of decoding a binary image at a high speed, the method including: determining whether a predetermined number of sequential pixels including a target pixel to be decoded in the binary image corresponds to any one of a white_run, a black_run, and a combined_run; and decoding the predetermined number of sequential pixels in a block per clock unit if the predetermined number of sequential pixels corresponds to any one of the white_run, the black_run, and the combined_run, wherein the predetermined number of sequential pixels including the target pixel corresponds to the white_run when the predetermined number of sequential pixels are all white, the black_run when the predetermined number of sequential pixels are all black, and the combined_run when the predetermined number of pixels are a mix of white and black.

The white_run and the black_run may have same context values in peripheral pixels of a target pixel to be decoded, and have same pixel values in a peripheral block of the target pixel.

If all the pixels of the context values of the peripheral pixels of the target pixel to be decoded are 0, and all the pixel values contained in the block are 0, the white_run may be determined.

If a More Probable Symbol (MPS) value of the target pixel to be decoded is 0, the white_run may be determined.

If all the pixels of the context values of the peripheral pixels of the target pixel to be decoded are 1, and all the pixel values of the block are 1, the black_run may be determined.

If a More Probable Symbol (MPS) value of the target pixel to be decoded is 1, the black_run may be determined.

If all the pixel values for each line of several templets are equal to each other, the combined_run may be determined.

If a More Probable Symbol (MPS) value of the target pixel to be decoded is equal to the pixel value of a first line of the templet, the combined_run may be determined.

According to another aspect of the present invention, there is provided a computer readable recording medium encoded with the method and implemented by a computer.

According to another aspect of the present invention, there is provided an apparatus to decode a binary image at a high speed, the apparatus including: a determining unit to determine whether a predetermined number of sequential pixels including a target pixel to be decoded in the binary image corresponds to any one of a white_run, a black_run, and a combined_run; and a decoding unit to decode the predetermined number of sequential pixels in a block unit per clock unit if the predetermined number of sequential pixels corresponds to any one of the white_run, the black_run, and the combined_run, wherein the predetermined number of sequential pixels including the target pixel corresponds to: the white_run when the predetermined number of sequential pixels are all white, the black_run when the predetermined number of sequential pixels are all black, and the combined_run when the predetermined number of pixels are a mix of white and black.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 is a structural diagram illustrating a 2-line templet supported by a JBIG decoder according to an embodiment of the present invention;

FIG. 5 is a structural diagram illustrating a 3-line templet supported by a JBIG decoder according to an embodiment of the present invention;

FIG. 6 is a structural diagram illustrating a white-run of a 2-line templet according to an embodiment of the present invention;

FIG. 7 is a structural diagram illustrating a black-run of a 2-line templet according to an embodiment of the present invention;

FIG. 8 is a structural diagram illustrating a combined-run of a 2-line templet according to an embodiment of the present invention;

FIG. 9 is a structural diagram illustrating a combined-run of a 2-line templet according to another embodiment of the present invention;

DETAILED DESCRIPTION OF THE EMBODIMENTS

Figure 1:
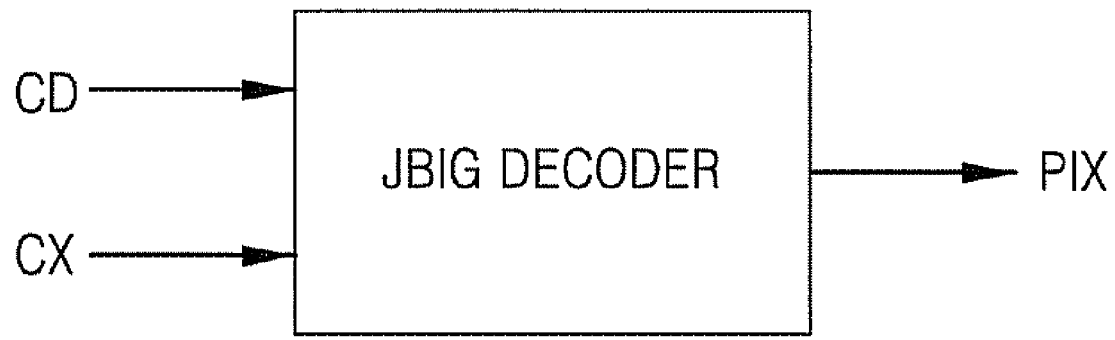
FIG. 1 is a block diagram illustrating I/O operations of a general JBIG decoder.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating input/output (I/O) operations of a general JBIG decoder. Referring to FIG. 1, the JBIG decoder receives a coded data CD and a context CX. The JBIG decoder decodes data using the coded data CD and the context CX, and outputs a pixel PIX.

Figure 2:
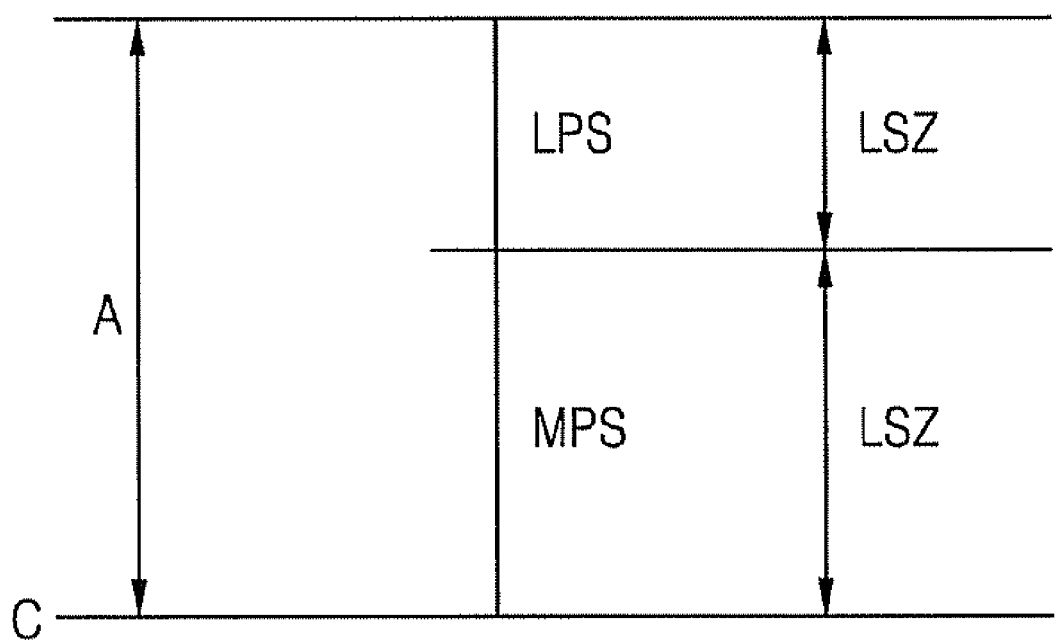
FIG. 2 is a conceptual diagram illustrating the JBIG decoder of FIG. 1.

FIG. 2 is a conceptual diagram illustrating the JBIG decoder of FIG. 1. Referring to FIG. 2, a variable A indicates a period-sized register, and a variable C indicates a code register. The variable A includes the size of a current decoding period normalized within the period of 0x8000-0x10000 (e.g., 0.75-1.5). For reference, if the JBIG decoder is initialized, the A value is set to 0x10000 (A=0x10000), and the C value is zero (C=0). The JBIG decoder divides a current period into two parts. The More Probable Symbol (MPS) is located in the lower part of the two parts, and the Least Probable Symbol (LPS) is located in the upper part of the two parts. The MPS is indicative of the more probable pixel, and the LPS is indicative of the less probable pixel. The Less Probable Symbol Size (LSZ) indicates the probability amplitude of the LPS.

Figure 3:
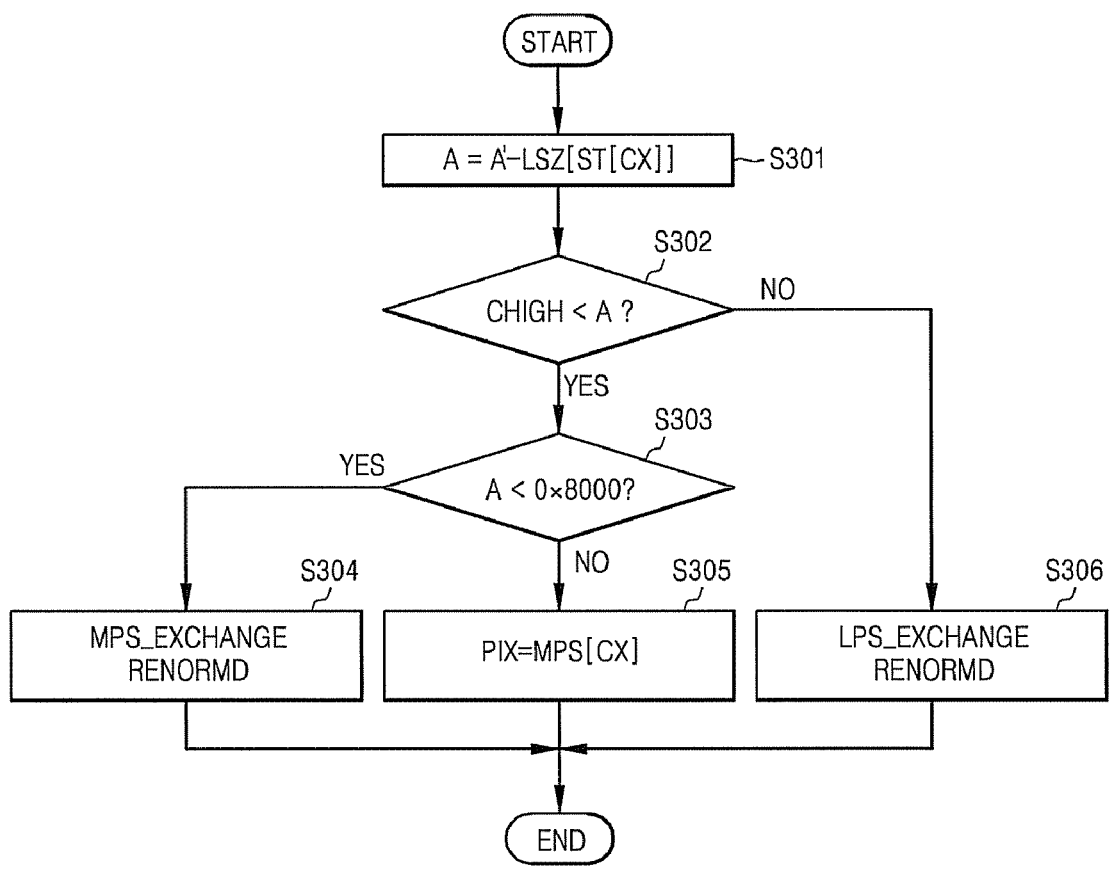
FIG. 3 is a flow chart illustrating a decoding method of the JBIG decoder of FIG. 1.

FIG. 3 is a flow chart illustrating a decoding method of the JBIG decoder of FIG. 1. Referring to FIG. 3, the JBIG decoder decodes a target pixel by calculating the context (CX) of peripheral pixels to the target pixel, and reading the LSZ value corresponding to the context (CX) from a table (LSZ[ST[CX]]).

Accordingly, the LSZ value is subtracted from the old period-sized register A' to calculate a new period-sized register A (A=A'-LSZ) in operation S301. The JBIG decoder then determines whether the new A value is greater than the CHIGH value, which is indicative of the $16^{th}$ bit of the C value, in operation S302.

If the A value is greater than the CHIGH value (operation S302), the JBIG decoder compares the A value with the value of 0x8000 in operation S303. If the A value is less than the 0x8000 value (operation S303), the JBIG decoder performs an MPS_EXCHANGEx function and a RENORMDx function in operation S304. In contrast, if the A value is greater than or equal to the 0x8000 value (operation S303), the JBIG decoder extracts the pixel PIX from the MPS[CX] value, and decodes the MPS[CX] value in operation S305. Meanwhile, if the A value is less than or equal to the CHIGH value (operation S302), the JBIG decoder performs an LPS_EXCHANGEx function and a RENORMDx function in operation S306.

As described above, the JBIG decoding is calculated in pixel units, such that the decoding speed becomes slower. Therefore, there is a need for an improved method capable of simultaneously decoding the overlapped parts (e.g., blanks) in block units, instead of decoding the same parts in pixel units.

The overlapped parts are classified into a white area, a black area, and a combined area. The white area includes white pixels successively arranged, and is referred to as a white_run. The black area includes black pixels successively arranged, and is referred to as a black_run. The combined area mixes the white area and the black area, and is referred to as a combined_run.

Figure 5:
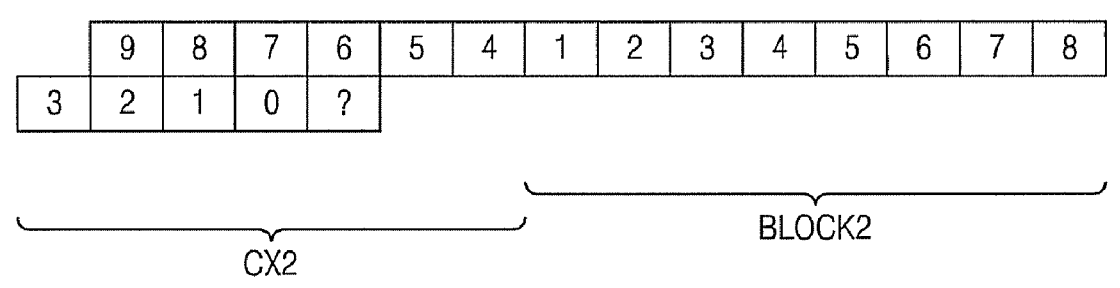

Referring to FIGS. 4 and 5, the JBIG decoder supports a 3-line templet (CX3) and a 2-line templet (CX2). For example, all the contexts corresponding to 8 pixels may be examined, such that the block areas (BLOCK2 and BLOCK3) are required. Accordingly, in the case of the 2-line templet (FIG. 5), pixels of the locations 0 to 9 in the vicinity of the target pixel "?" to be decoded correspond to the context (CX2), and pixels in which the 1 to 8 values are successively arranged correspond to the block (BLOCK2).

The above-mentioned operations can be employed according to the three methods, a detailed description of which will hereinafter be described in detail.

Figure 6:
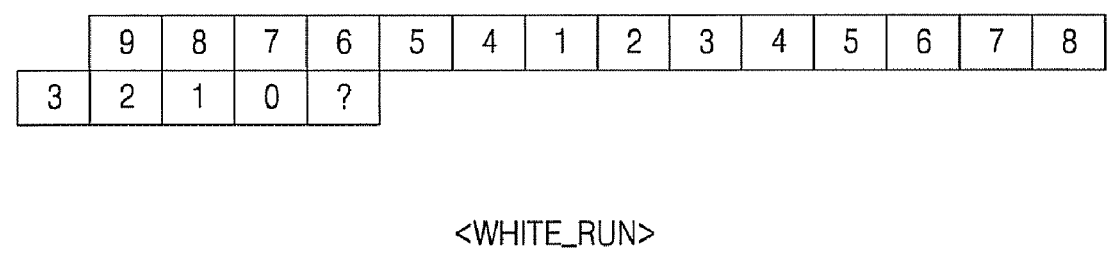

FIG. 6 is a structural diagram illustrating a white-run of a 2-line templet according to an embodiment of the present invention. Referring to FIG. 6, the white_run including sequential white pixels can be determined by the context, block, and MPS according to the following relationship:

2-line templet: White_run=($Cx2$==0)&(Block2==0)&($MPS$==0)

3-line templet: White_run=($CX3$==0)&(Block3==0)&($MPS$==0)

Namely, in the case of the 2-line templet, all the pixels of the context CX2 and the block (BLOCK2) that are in white are denoted by 0 corresponding to the white color. In this case, if the MPS value is 0, the white_run is determined. In the case of the 3-line templet, all the pixels of the context CX3 and the block (BLOCK3) that are in white are denoted by 0 corresponding to the white color. In this case, if the MPS value is 0, the white_run is determined.

Figure 7:
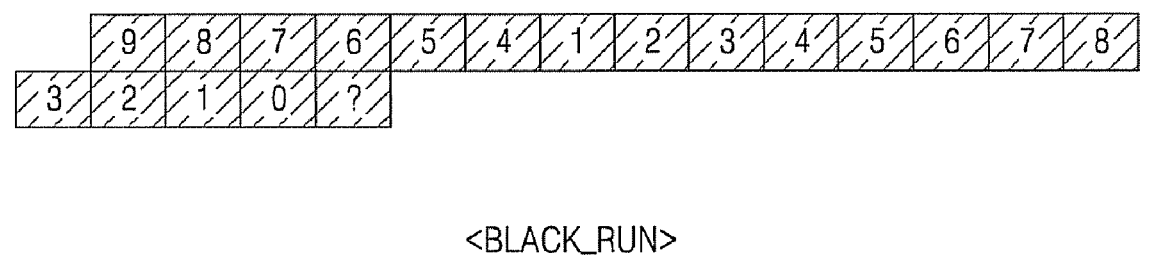

FIG. 7 is a structural diagram illustrating a black-run of a 2-line templet according to an embodiment of the present invention. Referring to FIG. 7, the black_run including sequential black pixels can be determined by the context, block, and MPS according to the following relationship:

2-line templet: Black_run=($Cx2$==0x3$ff$)&(Block2==0x$ff$)&($MPS$==1)

3-line templet: Black_run=($CX3$==0x3$ff$)&(Block3==0x$fff$)&($MPS$==1)

Namely, in the case of the 2-line templet, all the pixels of the context CX2 and the block (BLOCK2) that are in black are denoted by 1 corresponding to the black color. In this case, if the MPS value is 0, the black_run is determined. In the case of the 3-line templet, all the pixels of the context CX3 and the block (BLOCK3) that are in black are denoted by 1 corresponding to the black color. In this case, if the MPS value is 1, the black_run is determined.

Figure 8:
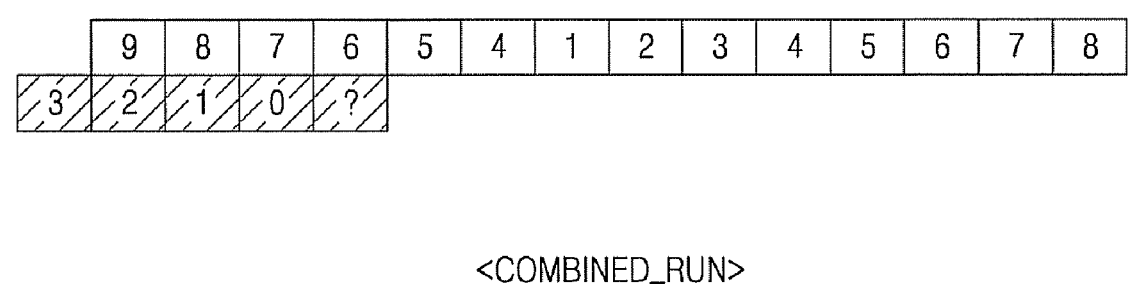
Figure 9:
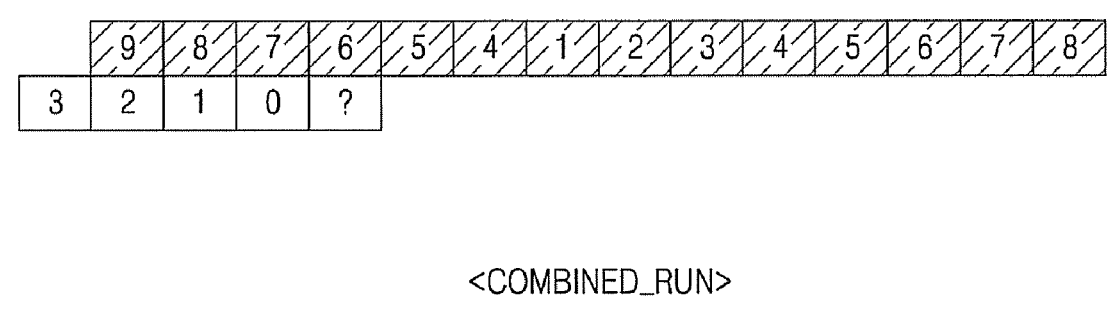

FIG. 8 is a structural diagram illustrating a combined-run of a 2-line templet according to an embodiment of the present invention. FIG. 9 is a structural diagram illustrating a combined-run of a 2-line templet according to another embodiment of the present invention. Referring to FIGS. 8 and 9, in the case of the combined_run under the 2-line templet, all the pixels of the first row of the combined_run are equal to each other, and all the pixels of the second row of the combined_run are equal to each other. In this case, if the MPS value is equal to the pixel of the first row (MPS==first row), the combined_run is determined. In the case of the combined_run under the 3-line templet (not illustrated), all the pixels of the first row of the combined_run are equal to each other, all the pixels of the second row of the combined_run are equal to each other, and al the pixels of the third row of the combined_run are equal to each other. In this case, if the MPS value is equal to the pixels of the first row (MPS==first row), the combined_run is determined.

If any one of the white_run, the black_run, and the combined_run is satisfied, it is determined that a current pixel exists in a plain area.

Figure 10:
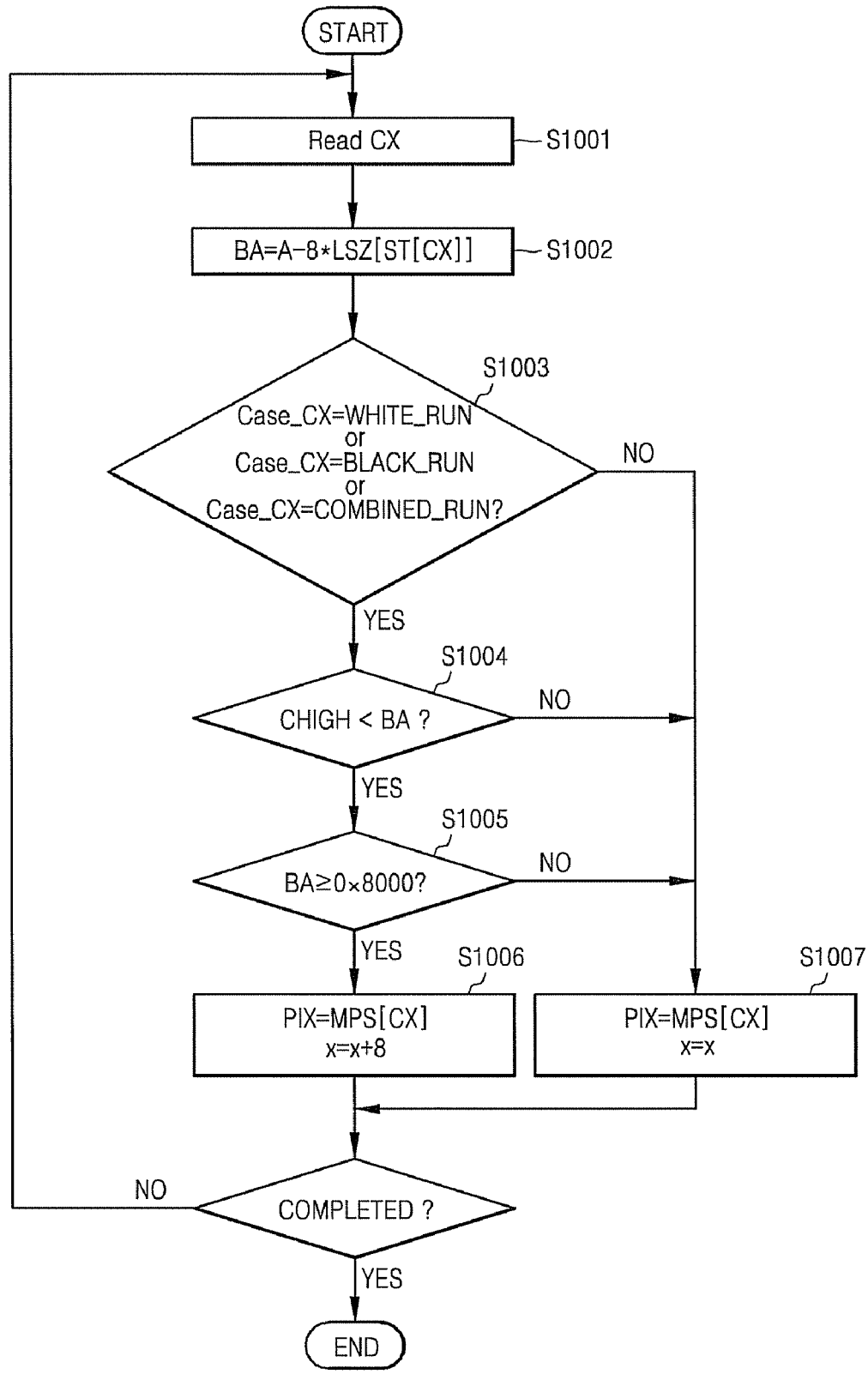
FIG. 10 is a flow chart illustrating a method for decoding a binary image according to an embodiment of the present invention.

FIG. 10 is a flow chart illustrating a method for decoding a binary image according to an embodiment of the present invention. For the convenience of description and better understanding of aspects of the present invention, the block unit of the 2-line templete shown in FIG. 4 includes 8 bits, and a detailed description thereof will hereinafter be described in detail.

Referring to FIG. 10, the decoder according to aspects of the present invention reads the context (CX) of pixels in the neighborhood of 8 sequential pixels to be decoded in operation S1001. The decoder reads the LSZ value corresponding to the read context (CX) from the table (LSZ[ST[CX]]). Then, the decoder subtracts the LSZ value from the old period-sized register A to calculate a new period-sized register BA of the block unit (8 bits) (BA=A−8*LSZ[ST[CX]]) in operation S1002.

Thereafter, the decoder determines whether the sequential pixels indicate the white_run, the black_run, or the combined_ run in operation S1003. If all the pixels of the context (CX2) and the block (BLOCK2) are 0, and the MPS value is also 0, the sequential pixels are determined to be the white_ run. If all the pixels of the context (CX2) and the block (BLOCK2) are 1, and the MPS value is 0, the sequential pixels are determined to be the black_run. In the meantime, if all the pixels of the first row are equal to each other, all the pixels of the second row are equal to each other, and the MPS value is equal to the pixels of the first row (MPS==first row), the sequential pixels are determined to be the combined_run.

If the sequential pixels are determined to be any one of the white_run, the black_run, and the combined_run (operation S1003), the decoder compares the CHIGH value with the BA value to determine whether the BA value is greater than the CHIGH value in operation S1004. If the BA value is greater than the CHIGH value (operation S1004), the decoder compares the BA value with the value 0x8000, to determine whether the BA value is greater than or equal to the 0x8000 value in operation S1005. If the BA value is greater than or equal to the 0x8000 value (operation S1005), the decoder extracts the sequential pixels (PIX) from the MPS [CX], and decodes the extracted pixels in 8-pixel units in operation S1006. Namely, the decoder decodes 8 pixels per clock.

Meanwhile, if the BA value is less than the 0x8000 value (operation S1005), the decoder extracts the sequential pixels (PIX) from the MPS[CX], and decodes the extracted pixels in pixel units in operation S1007. Namely, the decoder decodes a single pixel per clock.

Although the above-mentioned embodiments describe the decoding in block units of 8 bits, it is understood that aspects of the present invention are not limited to this example, and can also be applied to other examples (such as 16-bit block units, 32-bit block units, etc.).

Figure 11:
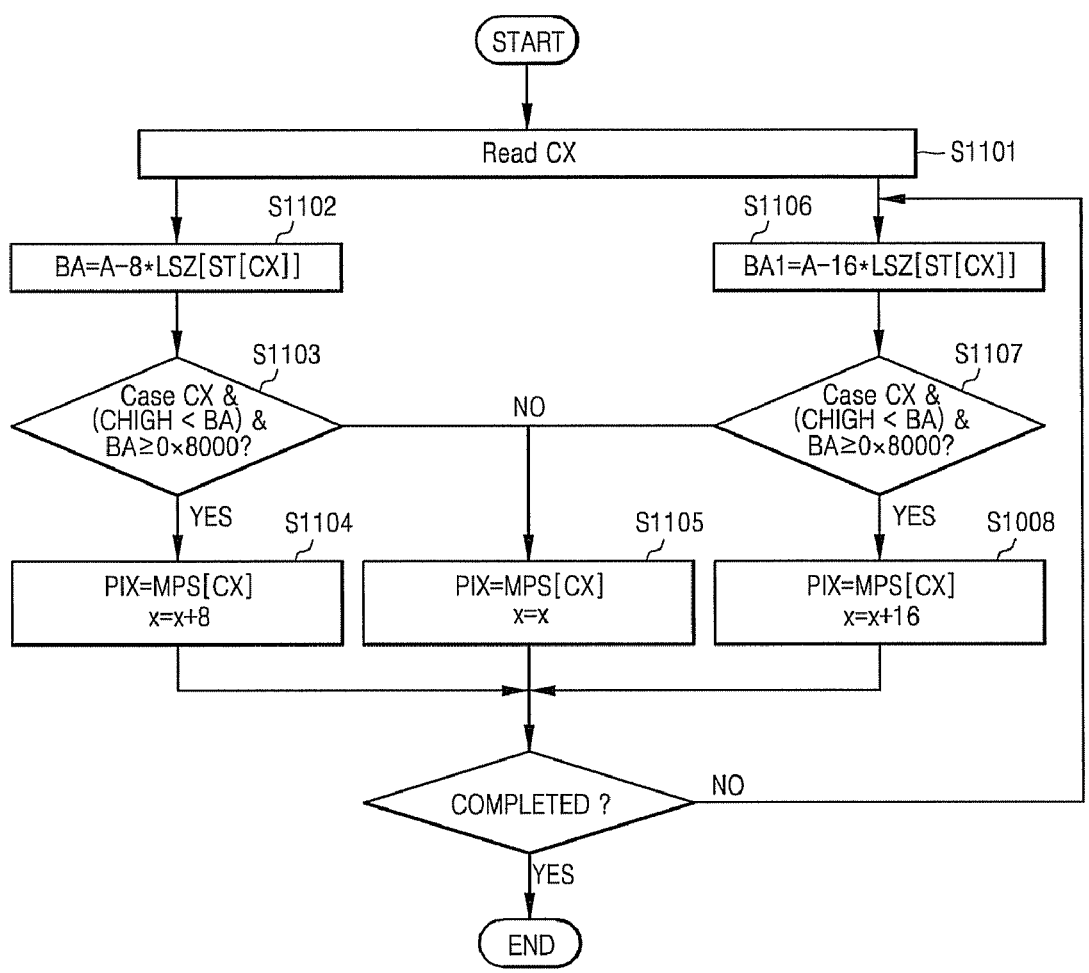
FIG. 11 is a flow chart illustrating a method for decoding a binary image according to another embodiment of the present invention.

Furthermore, although the above-mentioned embodiments have disclosed only the part decoded in 8-bit block units, it is understood that aspects of the present invention are not limited to this example, and can also be applied to other examples (See FIG. 11) capable of further increasing the decoding speed. As can be seen from FIG. 11, another decoding part decoded in 16-bit block units may be further connected in parallel to FIG. 10, such that the scope of the present invention can be further extended.

As is apparent from the above description, aspects of the present invention decode blocks having the same pixel values in block units, thereby increasing the decoding speed. Moreover, aspects of the present invention may interconnect the 8-bit decoding part, the 16-bit decoding part, and the 32-bit decoding part in the form of a parallel connection, thereby increasing the decoding speed.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of decoding a binary image at a high speed, the method comprising:
   determining whether a predetermined number of sequential pixels including a target pixel to be decoded in the binary image corresponds to any one of a white_run, a black_run, and a combined_run; and
   decoding the predetermined number of sequential pixels in a block per clock unit if the predetermined number of sequential pixels corresponds to any one of the white_ run, the black_run, and the combined_run,
   wherein the predetermined number of sequential pixels including the target pixel corresponds to:
      the white_run when the predetermined number of sequential pixels are all white,
      the black_run when the predetermined number of sequential pixels are all black, and the combined_run when the predetermined number of pixels are a mix of white and black, the predetermined number of sequential pixels have same context values in peripheral pixels of the target pixel when the predetermined number of sequential pixels corresponds to the white_run or the black_run, and the predetermined number of sequential pixels have same pixel values in a peripheral block of the target pixel when the predetermined number of sequential pixels corresponds to the white_run or the black_run.

2. The method as claimed in claim 1, wherein the determining of whether the predetermined number of sequential pixels corresponds to any one of the white_run, the black_run, and the combined_run comprises:

determining that the predetermined number of sequential pixels corresponds to the white_run if all of the peripheral pixels having the same context values are denoted by a value of 0, and the same pixel values in the peripheral block are 0.

3. The method as claimed in claim 1, wherein the determining of whether the predetermined number of sequential pixels corresponds to any one of the white_run, the black_run, and the combined_run comprises:

determining that the predetermined number of sequential pixels corresponds to the white_run if all of the peripheral pixels having the same context values are denoted by a value of 0, the same pixel values in the peripheral block are 0, and a More Probable Symbol (MPS) value of the target pixel to be decoded is 0.

4. The method as claimed in claim 1, wherein the determining of whether the predetermined number of sequential pixels corresponds to any one of the white_run, the black_run, and the combined_run comprises:

determining that the predetermined number of sequential pixels corresponds to the black_run if all of the peripheral pixels having the same context values are denoted by a value of 1, and the same pixel values in the peripheral block are 1.

5. The method as claimed in claim 1, wherein the determining of whether the predetermined number of sequential pixels corresponds to any one of the white_run, the black_run, and the combined_run comprises:

determining that the predetermined number of sequential pixels corresponds to the black_run if all of the peripheral pixels having the same context values are denoted by a value of 1, the same pixel values in the peripheral block are 1, and an MPS value of the target pixel to be decoded is 1.

6. The method as claimed in claim 1, further comprising:

decoding one pixel, of the predetermined number of sequential pixels, per clock unit if the predetermined number of sequential pixels corresponds to none of the white_run, the black_run, and the combined_run.

7. The method as claimed in claim 1, further comprising:

decoding, in parallel with the predetermined number of sequential pixels, a second predetermined number of sequential pixels in a second block per clock unit if the second predetermined number of sequential pixels corresponds to any one of the white_run, the black_run, and the combined_run, wherein the second block is a different size than the block.

8. The method as claimed in claim 7, wherein the block is any one of an 8-bit block, a 16-bit block, and a 32-bit block, and the second block is a different one of the 8-bit block, the 16-bit block, and the 32-bit block.

9. The method as claimed in claim 1, wherein the block is any one of an 8-bit block, a 16-bit block, and a 32-bit block.

10. The method as claimed in claim 1, wherein the decoding of the predetermined number of sequential pixels is a JBIG decoding.

11. A non-transitory computer readable recording medium encoded with software of the method of claim 1 and implemented by a computer.

12. A method of decoding a binary image at a high speed, the method comprising:

determining whether a predetermined number of sequential pixels including a target pixel to be decoded in the binary image corresponds to any one of a white_run, a black_run, and a combined_run; and decoding the predetermined number of sequential pixels in a block per clock unit if the predetermined number of sequential pixels corresponds to any one of the white_run, the black_run, and the combined_run, wherein the predetermined number of sequential pixels including the target pixel corresponds to:

the white_run when the predetermined number of sequential pixels are all white, the black_run when the predetermined number of sequential pixels are all black, and the combined_run when the predetermined number of pixels are a mix of white and black, wherein the determining of whether the predetermined number of sequential pixels corresponds to any one of the white_run, the black_run, and the combined_run comprises:

determining the combined_run if, for each line of a templet, all pixel values of the line are equal.

13. A method of decoding a binary image at a high speed, the method comprising:

determining whether a predetermined number of sequential pixels including a target pixel to be decoded in the binary image corresponds to any one of a white_run, a black_run, and a combined_run; and decoding the predetermined number of sequential pixels in a block per clock unit if the predetermined number of sequential pixels corresponds to any one of the white_run, the black_run, and the combined_run, wherein the predetermined number of sequential pixels including the target pixel corresponds to:

the white_run when the predetermined number of sequential pixels are all white, the black_run when the predetermined number of sequential pixels are all black, and the combined_run when the predetermined number of pixels are a mix of white and black, wherein the determining of whether the predetermined number of sequential pixels corresponds to any one of the white_run, the black_run, and the combined_run comprises:

determining the combined_run if, for each line of a templet, all pixel values of the corresponding line are equal and a More Probable Symbol (MPS) value of the target pixel to be decoded is equal to a pixel value of a first line of the templet.

14. An apparatus to decode a binary image at a high speed, the apparatus comprising:

a determining unit to determine whether a predetermined number of sequential pixels including a target pixel to be decoded in the binary image corresponds to any one of a white_run, a black_run, and a combined_run; and a decoding unit to decode the predetermined number of sequential pixels in a block per clock unit if the predetermined number of sequential pixels corresponds to any one of the white_run, the black_run, and the combined_run,
wherein the predetermined number of sequential pixels including the target pixel corresponds to:
the white_run when the predetermined number of sequential pixels are all white,
the black_run when the predetermined number of sequential pixels are all black, and
the combined_run when the predetermined number of pixels are a mix of white and black,
the predetermined number of sequential pixels have same context values in peripheral pixels of the target pixel when the predetermined number of sequential pixels corresponds to the white_run or the black_run, and
the predetermined number of sequential pixels have same pixel values in a peripheral block of the target pixel when the predetermined number of sequential pixels corresponds to the white_run or the black_run.

15. The apparatus as claimed in claim 14, wherein the determining unit determines that the predetermined number of sequential pixels corresponds to the white_run if all of the peripheral pixels having the same context values are denoted by a value of 0, and the same pixel values in the peripheral block are 0.

16. The apparatus as claimed in claim 14, wherein the determining unit determines that the predetermined number of sequential pixels corresponds to the white_run if all of the peripheral pixels having the same context values are denoted by a value of 0, the same pixel values in the peripheral block are 0, and a More Probable Symbol (MPS) value of the target pixel to be decoded is 0.

17. The apparatus as claimed in claim 14, wherein the determining unit determines that the predetermined number of sequential pixels corresponds to the black_run if all of the peripheral pixels having the same context values are denoted by a value of 1, and the same pixel values in the peripheral block are 1.

18. The apparatus as claimed in claim 14, wherein the determining unit determines that the predetermined number of sequential pixels corresponds to the black_run if all of the peripheral pixels having the same context values are denoted by a value of 1, the same pixel values in the peripheral block are 1, and an MPS value of the target pixel to be decoded is 1.

19. The apparatus as claimed in claim 14, wherein the decoding unit decodes one pixel, of the predetermined number of sequential pixels, per clock unit if the predetermined number of sequential pixels corresponds to none of the white_run, the black_run, and the combined_run.

20. The apparatus as claimed in claim 14, wherein the decoding unit decodes, in parallel with the predetermined number of sequential pixels, a second predetermined number of sequential pixels in a second block per clock unit if the second predetermined number of sequential pixels corresponds to any one of the white_run, the black_run, and the combined_run,
wherein the second block is a different size than the block.

21. The apparatus as claimed in claim 20, wherein the block is any one of an 8-bit block, a 16-bit block, and a 32-bit block, and the second block is a different one of the 8-bit block, the 16-bit block, and the 32-bit block.

22. The apparatus as claimed in claim 14, wherein the block is any one of an 8-bit block, a 16-bit block, and a 32-bit block.

23. The apparatus as claimed in claim 14, wherein the decoding unit is a JBIG decoder.

24. An apparatus to decode a binary image at a high speed, the apparatus comprising:
a determining unit to determine whether a predetermined number of sequential pixels including a target pixel to be decoded in the binary image corresponds to any one of a white_run, a black_run, and a combined_run; and
a decoding unit to decode the predetermined number of sequential pixels in a block per clock unit if the predetermined number of sequential pixels corresponds to any one of the white_run, the black_run, and the combined_run,
wherein the predetermined number of sequential pixels including the target pixel corresponds to:
the white_run when the predetermined number of sequential pixels are all white,
the black_run when the predetermined number of sequential pixels are all black, and
the combined_run when the predetermined number of pixels are a mix of white and black, and
wherein the determining unit determines the combined_run if, for each line of a templet, all pixel values of the line are equal.

25. An apparatus to decode a binary image at a high speed, the apparatus comprising:
a determining unit to determine whether a predetermined number of sequential pixels including a target pixel to be decoded in the binary image corresponds to any one of a white_run, a black_run, and a combined_run; and
a decoding unit to decode the predetermined number of sequential pixels in a block per clock unit if the predetermined number of sequential pixels corresponds to any one of the white_run, the black_run, and the combined_run,
wherein the predetermined number of sequential pixels including the target pixel corresponds to:
the white_run when the predetermined number of sequential pixels are all white,
the black_run when the predetermined number of sequential pixels are all black, and
the combined_run when the predetermined number of pixels are a mix of white and black, and
wherein the determining unit determines the combined_run if, for each line of a templet, all pixel values of the corresponding line are equal and a More Probable Symbol (MPS) value of the target pixel to be decoded is equal to a pixel value of a first line of the templet.

* * * * *